United States Patent
Wei et al.

(10) Patent No.: US 11,067,871 B2
(45) Date of Patent: Jul. 20, 2021

(54) INTEGRATED IMAGING APPARATUS AND DISPLAY DEVICE

(71) Applicant: BOE Technology Group Co., Ltd., Beijing (CN)

(72) Inventors: Baoqiang Wei, Beijing (CN); Jifeng Tan, Beijing (CN); Xiaochuan Chen, Beijing (CN); Wenqing Zhao, Beijing (CN); Xue Dong, Beijing (CN); Chenyu Chen, Beijing (CN); Xiaochen Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 16/196,305

(22) Filed: Nov. 20, 2018

(65) Prior Publication Data
US 2019/0361317 A1    Nov. 28, 2019

(30) Foreign Application Priority Data

May 24, 2018 (CN) .......................... 201810508616.8

(51) Int. Cl.
G02F 1/29    (2006.01)

(52) U.S. Cl.
CPC ................ *G02F 1/29* (2013.01); *G02F 1/294* (2021.01); *G02F 2201/12* (2013.01)

(58) Field of Classification Search
CPC ... G02F 1/29; G02F 2001/294; G02F 2201/12
USPC .......................................................... 349/1
See application file for complete search history.

(56) References Cited

U.S. PATENT DOCUMENTS

| | | | |
|---|---|---|---|
| 2015/0009560 A1* | 1/2015 | Kang | G02B 3/0062 359/463 |
| 2016/0105668 A1 | 4/2016 | Fang | |
| 2016/0124233 A1* | 5/2016 | Wei | G02F 1/133753 349/126 |

FOREIGN PATENT DOCUMENTS

| | | |
|---|---|---|
| CN | 104007556 A | 8/2014 |
| CN | 104168472 A | 11/2014 |
| CN | 104297930 A | 1/2015 |

(Continued)

OTHER PUBLICATIONS

First office action of Chinese application No. 201810508616.8 dated Mar. 10, 2020.

(Continued)

*Primary Examiner* — Nathanael R Briggs
*Assistant Examiner* — William D Peterson
(74) *Attorney, Agent, or Firm* — Fay Sharpe LLP

(57) ABSTRACT

The present disclosure provides an integrated imaging apparatus and a display device. The integrated imaging apparatus includes: a display member, an incident light adjusting member, a lens array and a second lens that are sequentially arranged. The display member is configured to display an image; the incident light adjusting member is configured to reduce a pixel divergence angle of an incident light emitted by the display member; the lens array includes a plurality of first lens, the plurality of first lens being arranged on a plane parallel to the display member; and the second lens and the display member are coaxially arranged. The present disclosure effectively extends the field of depth, thereby improving the imaging effect of the integrated imaging apparatus.

17 Claims, 16 Drawing Sheets

(56) References Cited

FOREIGN PATENT DOCUMENTS

| | | |
|---|---|---|
| CN | 104297994 A | 1/2015 |
| CN | 107357047 A | 11/2017 |

OTHER PUBLICATIONS

Second office action of Chinese application No. 201810508616.8 dated Sep. 23, 2020.
Sung-Wook Min, et al; Three-dimensional eletro-floating display system using an integral imaging method; Optics Express, vol. 13, No. 12; Jun. 30, 2005.

* cited by examiner

INTEGRATED IMAGING APPARATUS AND DISPLAY DEVICE

This application claims priority to Chinese Patent Application No. 201810508616.8, filed on May 24, 2018 and titled "INTEGRATED IMAGING APPARATUS AND DISPLAY DEVICE HAVING THE SAME", the entire contents of which are incorporated herein by reference.

TECHNICAL FIELD

The present disclosure relates to the field of display equipment technology, and more particularly to an integrated imaging apparatus and a display device.

BACKGROUND

Depth of field (DOF) refers to a depth that can be clearly identified in an imaging space for the three-dimensional image. That is, the DOF is a front-to-rear distance range of an object measured by an imaging apparatus when a clear image of the object is obtained at a front edge of the imaging apparatus (for example, camera lens or other imaging devices). The DOF depends on a spacing between a left marginal display plane and a right marginal display plane. Due to restrictions of the structure of the imaging apparatus, an integrated imaging apparatus has the inherent characteristics of small DOF, which seriously affects the imaging quality.

SUMMARY

There are provided an integrated imaging apparatus and a display device in the present disclosure.

According to a first aspect of the present disclosure, there is provided an integrated imaging apparatus, comprising: a display member, an incident light adjusting member, a lens array and a second lens that are sequentially arranged.

The display member is configured to display an image.

The incident light adjusting member has an adjustable refractive index, and is configured to reduce a pixel divergence angle of an incident light emitted by the display member.

The lens array comprises a plurality of first lens, the plurality of first lens being on a plane parallel to the display member.

The second lens is coaxial with the display member.

Optionally, the display member is a display panel having a plurality of pixel units, and the incident light adjusting member has a plurality of prism groups one-to-one corresponding to the plurality of pixel units, and the prism group being configured to reduce a pixel divergence angle of an incident light of a corresponding pixel unit in the display panel.

Optionally, the prism group comprises a first prism unit and a second prism unit that are symmetrically arranged, a light incident surface of the first prism unit and a light incident surface of the second prism unit being in a same plane.

Optionally, the prism group is configured to enable a pixel divergence angle $\theta$ of the incident light of the corresponding pixel unit and a deflection angle $\alpha$ of a light emitted from the prism group to satisfy $\theta - 2\alpha \leq \theta 0$; wherein $\theta 0 = 2 \arctan[p/(2g)]$, g is a distance from the display member to the lens array, and p is a diameter of a first lens in the lens array.

According to some embodiments of the present disclosure, the incident light adjusting unit is a liquid crystal prism.

In some embodiments, the liquid crystal prism comprises: a first substrate, a second substrate, a first electrode layer, a second electrode layer and a liquid crystal layer.

The second electrode layer is on the first substrate, the first electrode layer is on the second substrate, the second electrode layer comprises a plurality of second electrodes, and the liquid crystal layer is between the first electrode layer and the second electrode layer.

Furthermore, the liquid crystal prism further comprises a first alignment layer, the first alignment layer being on a side of the second electrode layer away from the first substrate.

Optionally, the liquid crystal prism further comprises a first alignment layer, the second alignment layer being on a side of the first electrode layer away from the second substrate.

Optionally, the first electrode layer comprises a transparent conductive material.

Optionally, the second electrode layer comprises a transparent conductive material.

Optionally, the first electrode layer comprises indium tin oxide.

Optionally, the second electrode layer comprises indium tin oxide.

Optionally, the liquid crystal prism has a plurality of prism groups one-to-one corresponding to the plurality of pixel units, each of the prism groups comprising a first prism unit and a second prism unit that are symmetrically arranged, a light incident surface of the first prism unit and a light incident surface of the second prism unit being in a same plane.

Each of the first prism units and each of the second prism units both comprise a first electrode layer, a plurality of second electrodes and a liquid crystal layer between the first electrode layer and the plurality of second electrodes, a potential difference between the plurality of second electrodes and the first electrode layer of each of the first prism units gradually increasing along a first direction, a potential difference between the plurality of second electrodes and the first electrode layer of each of the second prism units gradually decreasing along the first direction, and the plurality of first prism units and the plurality of second prism units in the liquid crystal prism are in a staggered manner along the first direction.

Optionally, the second electrode layer comprises a first sub-electrode layer and a second sub-electrode layer that are insulated from each other, the first sub-electrode layer and the second sub-electrode layer both comprising a plurality of second electrodes, an orthographic projection of the second electrodes of the first sub-electrode layer on the first substrate not overlapping an orthographic projection of the second electrodes of the second sub-electrode layer on the first substrate.

Optionally, the plurality of second electrodes included in the first sub-electrode layer and the plurality of second electrodes included in the second sub-electrode layer are in a staggered manner.

Optionally, the liquid crystal prism further comprises an insulating layer, the insulating layer being between the first electrode layer and the second electrode layer.

Optionally, the integrated imaging apparatus comprises: a display member, a liquid crystal prism, a lens array and a second lens that are sequentially arranged.

The display member is configured to display an image.

The liquid crystal prism has an adjustable refractive index, and is configured to reduce a pixel divergence angle of an incident light emitted by the display member.

The lens array comprises a plurality of first lens, the plurality of first lens being on a plane parallel to the display member.

The second lens is coaxial with the display member.

The liquid crystal prism comprises: a first sub-electrode layer, an insulating layer, a second sub-electrode layer and an alignment layer that are laminated on the first substrate, the first sub-electrode layer and the second sub-electrode layer both comprising a plurality of second electrodes, the plurality of second electrodes of the first sub-electrode layer and the plurality of second electrode of the second sub-electrode layer being in a staggered manner, an orthographic projection of the second electrodes included in the first sub-electrode layer on the first substrate not overlapping an orthographic projection of the second electrodes included in the second sub-electrode layer on the first substrate.

A first electrode layer and a second alignment layer laminated on the second substrate.

A liquid crystal layer between the first alignment layer and the second alignment layer.

The liquid crystal prism has a plurality of prism groups one-to-one corresponding to the plurality of pixel units, each of the prism groups comprising a first prism unit and a second prism unit that are symmetrically arranged, a light incident surface of the first prism unit and a light incident surface of the second prism unit are in a same plane.

Each of the first prism units and each of the second prism units both comprise a first electrode layer, a plurality of second electrodes and a liquid crystal layer between the first electrode layer and the plurality of second electrodes, a potential difference between the plurality of second electrodes and the first electrode layer of each of the first prism units gradually increasing along a first direction, a potential difference between the plurality of second electrodes and the first electrode layer of each of the second prism units gradually decreasing along the first direction, and the plurality of first prism units and the plurality of second prism units in the liquid crystal prism are in a staggered manner along the first direction.

Optionally, the display member is a liquid crystal display panel.

Optionally, the display member is an organic light-emitting diode display panel.

According to a second aspect of the present disclosure, there is provided a display device, comprising: a control circuit and an integrated imaging apparatus, the integrated imaging apparatus comprising: a display member, an incident light adjusting member, a lens array and a second lens that are sequentially arranged.

The control circuit is configured to control the display member to display an image.

The incident light adjusting member has an adjustable refractive index, and is configured to reduce a pixel divergence angle of an incident light emitted by the display member.

The lens array comprises a plurality of first lens, the plurality of first lens being on a plane parallel to the display member.

The second lens is coaxial with the display member.

DETAILED DESCRIPTION

Figure 1:
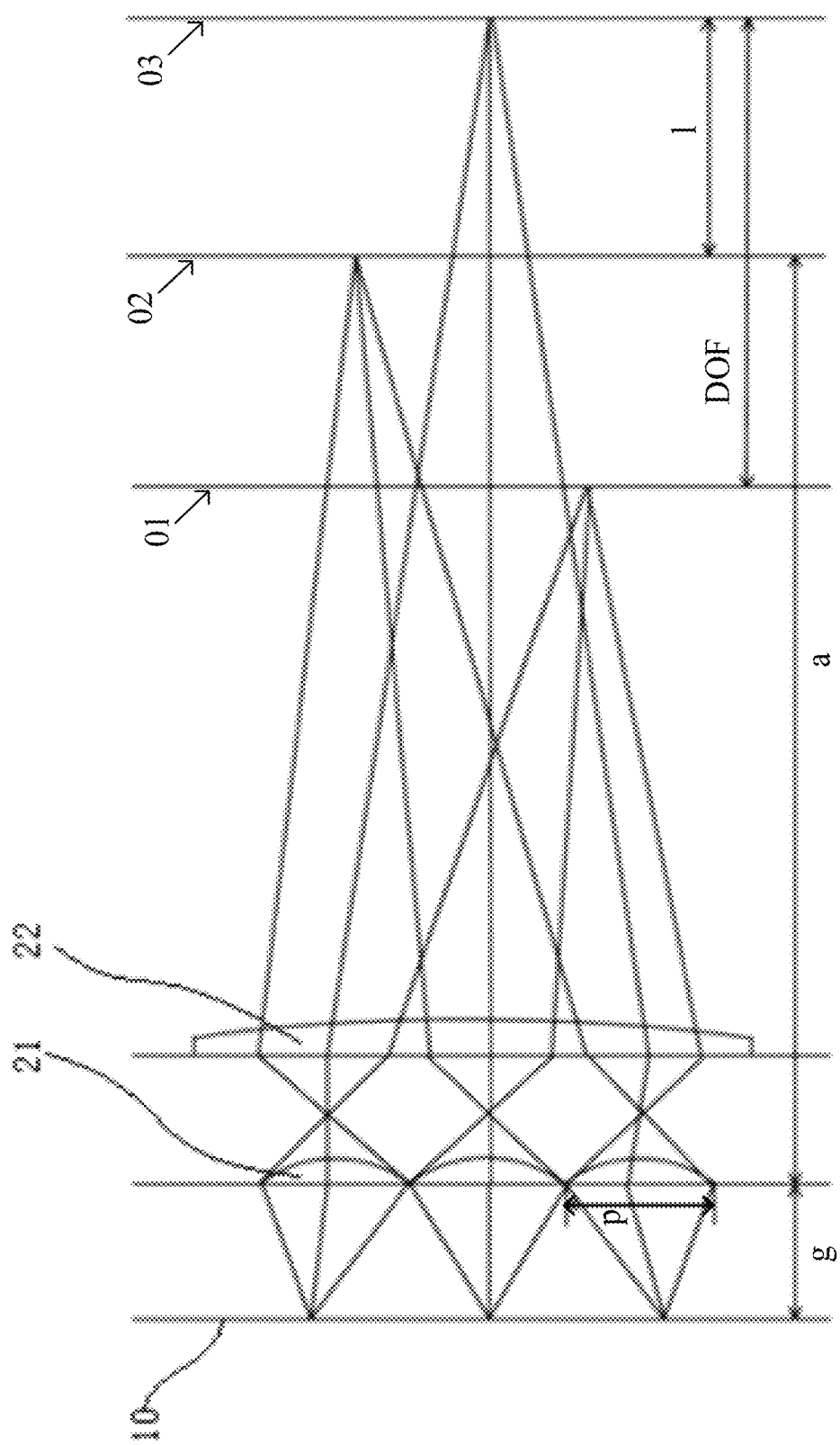
FIG. 1 is a principle diagram showing a depth of field of an integrated imaging device according to an embodiment of the present disclosure.

Depth of Field (DOF) refers to a depth that can be clearly identified in an imaging space for three-dimensional image. An integrated imaging apparatus may generally form images at different locations on one side of a display member of the integrated imaging apparatus. By imaging at the different locations, a user may view the images having depth information from the other side of the display member. For example, as illustrated in FIG. 1, the integrated imaging apparatus may form images on a left marginal display plane (MDP) 01, a central display plane (CDP) 02 and a right MDP 03 respectively, such that the user may view the images having the depth information from the other side of the display member. Herein, the left MDP is a plane where a virtual image formed by the integrated imaging apparatus at a corresponding location (a location of a left DOF margin of the image having the depth information) is located, the CDP is a plane where a virtual image formed by the integrated imaging apparatus at the corresponding location (a location between the left DOF margin and the right DOF margin of the imaging having the depth information) is located, and the right MDP is a plane where a virtual image formed by the integrated imaging apparatus at the corresponding location (a location of the right DOF margin of the image having the depth information) is located. Herein, the left DOF margin and the right DOF margin are two opposite DOF margins of the image having the depth information. Generally, the left DOF margin is closer to the display member relative to the right DOF margin.

Principles of the DOF in the three-dimensional technologies for integrated imaging are illustrated in FIG. 1. The DOF depends on a spacing between the left MDP 01 and the right MDP 03. The greater the spacing is, the greater the DOF is. The right MDP and the left MDF are both closely correlated to parameters of the integrated imaging apparatus. The DOF mainly depends on a maximum light spot diameter Smax that can be accepted by the integrated imaging apparatus. The maximum light spot diameter Smax is a diameter of the light spot when the integrated imaging apparatus is capable of clearly defining and displaying the image. Based on the maximum light spot diameter, the DOF may be calculated by using the following formula:

$$DOF = 2 \times S_{max} \times \frac{a}{p}$$

In the above formula, a represents a distance from the CDP to a lens array, p represents a diameter (that is, an aperture) of a first lens 21 in the lens array, $S_{max}$ is calculated based on g and l, g represents a distance from a display member 10 to the lens array, and l represents a distance from the right MDP to the CDP.

Generally, the maximum light spot diameter of an integrated imaging apparatus 100 may be determined based on the resolution at a clear viewing distance of the human eyes. Exemplarily, when an angular resolution of the human eyes is 1' and the clear viewing distance is 250 mm, it may be determined that the maximum light spot diameter Smax of the integrated imaging apparatus 100 is 0.9 mm. The clear viewing distance is a working distance that is most habitual and convenient for the human eyes under proper illuminations.

As known from the principles of integrated imaging, the DOF is mainly concentrated in the vicinity of the CDP, and the DOF is greater if the distance from the left MDP to the right MDP is greater. Therefore, the DOF may be increased in a manner of forming images on the left MDP and the right MDP that are greatly away from each other. In addition, the image can be formed on the left MDP and the right MDP that are greatly away from each other by reducing a pixel divergence angle of an incident light. That is, the smaller the pixel divergence angle of the incident light is, the more concentrated incident light that can be refracted to the vicinity of the CDP. Accordingly, the present disclosure provides an integrated imaging apparatus 100 that is capable of reducing the pixel divergence angle of the incident light, and thus extending the DOF and improving the display effect.

Figure 2:
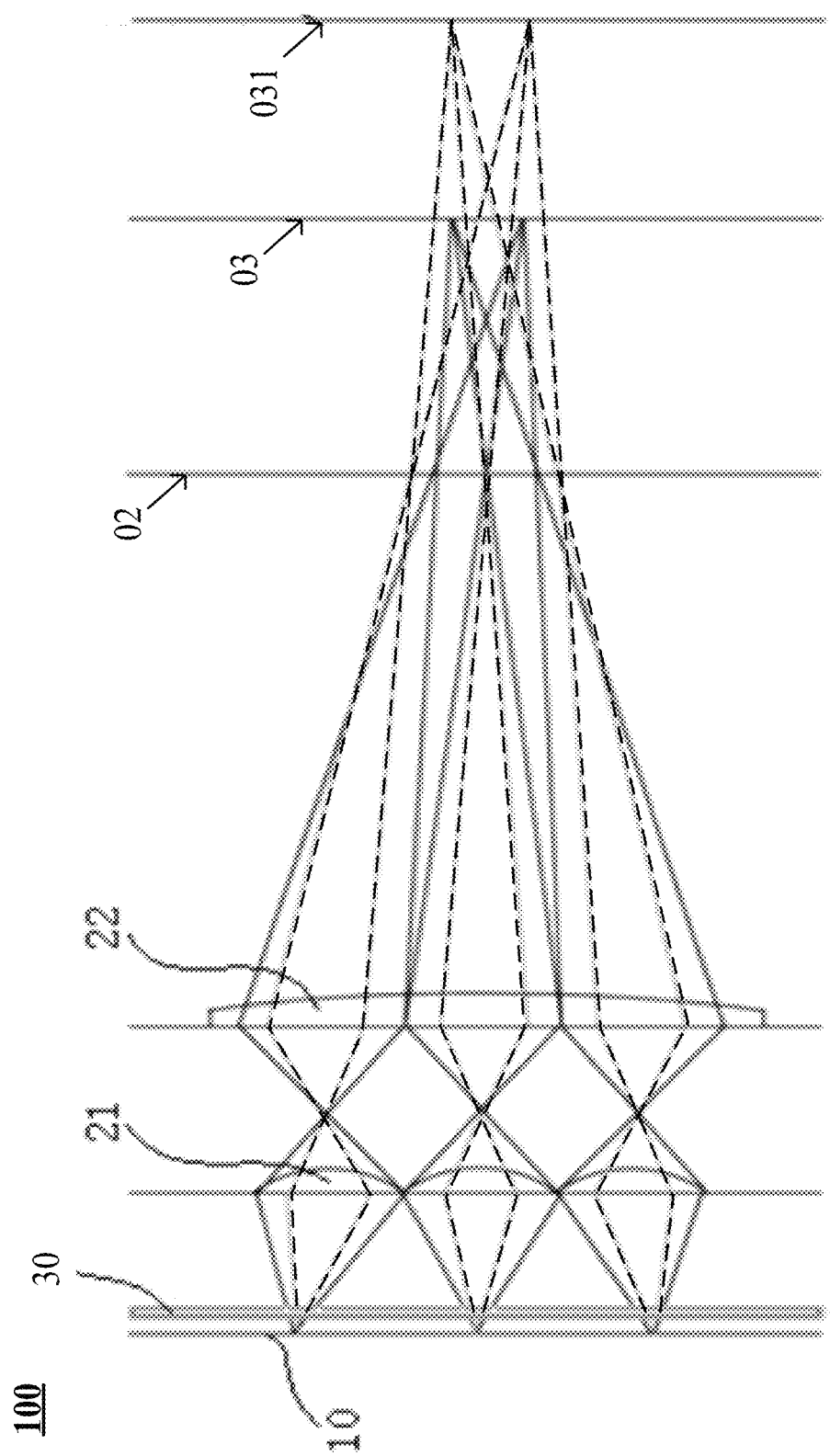
FIG. 2 is a schematic diagram of an integrated imaging apparatus according to an embodiment of the present disclosure.

As illustrated in FIG. 2, the integrated imaging apparatus 100 includes: a display member 10, an incident light adjusting member 30, a lens array and a second lens 22 that are sequentially arranged.

The display member 10 is configured to display an image. The display member 10 may include a plurality of pixel units that are arranged in an array. Optionally, the display member 10 may be a display panel. For example, the display panel may be a liquid crystal panel or an organic light-emitting diode display panel.

The incident light adjusting member 30 has an adjustable refractive index, and is configured to reduce a pixel divergence angle of an incident light emitted by the display member 10.

The lens array includes a plurality of first lens 21. The plurality of first lens 21 may be arranged in an array on a plane parallel to the display member 10. Exemplarily, the plurality of first lens 21 may correspond to the plurality of pixel units. For example, the plurality of first lens 21 may one-to-one correspond to the plurality of pixel units.

The second lens 22 and the display member 10 are coaxially arranged. That is, an optical axis of the second pens 22 passes through the center of the display member 10.

As illustrated in FIG. 2, dotted lines represent lights transmitted in the integrated imaging apparatus 100 according to the embodiment of the present disclosure, and solid lines represent lights transmitted in a conventional imaging apparatus in which no incident light adjusting member is arranged. In FIG. 2, a pixel divergence angle of an incident light emitted by a display panel in the conventional integrated imaging apparatus is the same as the pixel divergence angle of the light emitted by the display panel 10 in the integrated imaging apparatus according to the embodiment of the present disclosure. In the embodiments of the present disclosure, after passing through the incident light adjusting member 30, the pixel divergence angle is reduced. As seen from FIG. 2, the incident light with the pixel divergence angle not being reduced may be imaged as far as possible on a right marginal display plane 03 (that is, a right marginal display plane of the conventional integrated imaging apparatus), whereas the incident light with the pixel divergence angle being reduced may be imaged on an extended right marginal display plane 031 that is farther away from a central display plane 02 (that is, a right marginal display plane of the conventional integrated imaging apparatus according to the embodiment of the present disclosure) after passing through the lens array and the second lens 22. Therefore, the integrated imaging apparatus according to the embodiment of the present disclosure extends the DOF.

In summary, in the integrated imaging apparatus according to the embodiments of the present disclosure, the incident light adjusting member is arranged between the display member and the lens array, such that the pixel divergence angle of the incident light emitted by the display member may be adjusted. That is, the pixel divergence angle of the incident light is reduced by the incident light adjusting member, such that more incident lights are refracted to the vicinity of the central display plane. In this way, the image may be formed on the left marginal display plane and the right marginal display plane which are greatly away from each other, the DOF may be effectively extended, and the imaging effect of the integrated imaging apparatus may be improved.

Herein, the light (that is, the incident light) emitted by the display member 10 may enter the incident light adjusting member 30, then may be refracted to the first lens 21 after the pixel divergence angle of the light is reduced by the incident light adjusting member 30, and be refracted by the second lens 22 and then projected to the left marginal display plane and the right marginal display plane which are greatly away from each other. In this way, the DOF is extended.

The incident light adjusting member 30 may include a plurality of prism groups that one-to-one correspond to the plurality of pixel units, wherein each prism group is configured to reduce a pixel divergence angle of an incident light emitted by a corresponding pixel unit in the display member. Optionally, the size of the prism group may be the same as that of the corresponding pixel unit. In addition, each prism group may include a first prism unit and a second prism unit that are symmetrically arranged, wherein incident light surfaces of the first prism unit and the second prism unit are in the same plane. In this case, a plurality of first prism units and a plurality of second prism units of the incident light adjusting member 30 may be arranged in a staggered manner along a first direction, wherein the first direction is a direction perpendicular to an optical axis of the second lens 22.

Exemplarily, when a planer display panel has a size of 13.3 inches and has a resolution of 8K, R subpixels, G subpixels and B subpixels in the display panel are arranged in a BV3 manner of R, G, B, R, . . . , B, R, G and B. In this case, each subpixel has a size of 25.5×38.25 μm, and each pixel unit has a size of 25.5×3×38.25 μm. Thus, the prism group has a length of 25.5×3=76.5 μm in a horizontal direction, and has a length of 38.25 μm in a vertical direction. Exemplarily, when the pixel unit is rectangular, the horizontal direction is parallel to a width direction of the pixel unit, and the vertical direction is parallel to a length direction of the pixel unit. As such, a prism group is arranged for each of the pixels units on the surface thereof facing towards the first lens 21, such that the pixel divergence angle of the incident light of each of the pixel units is adjusted by the corresponding prism group. In this way, the adjustment accuracy is improved.

Figure 3:
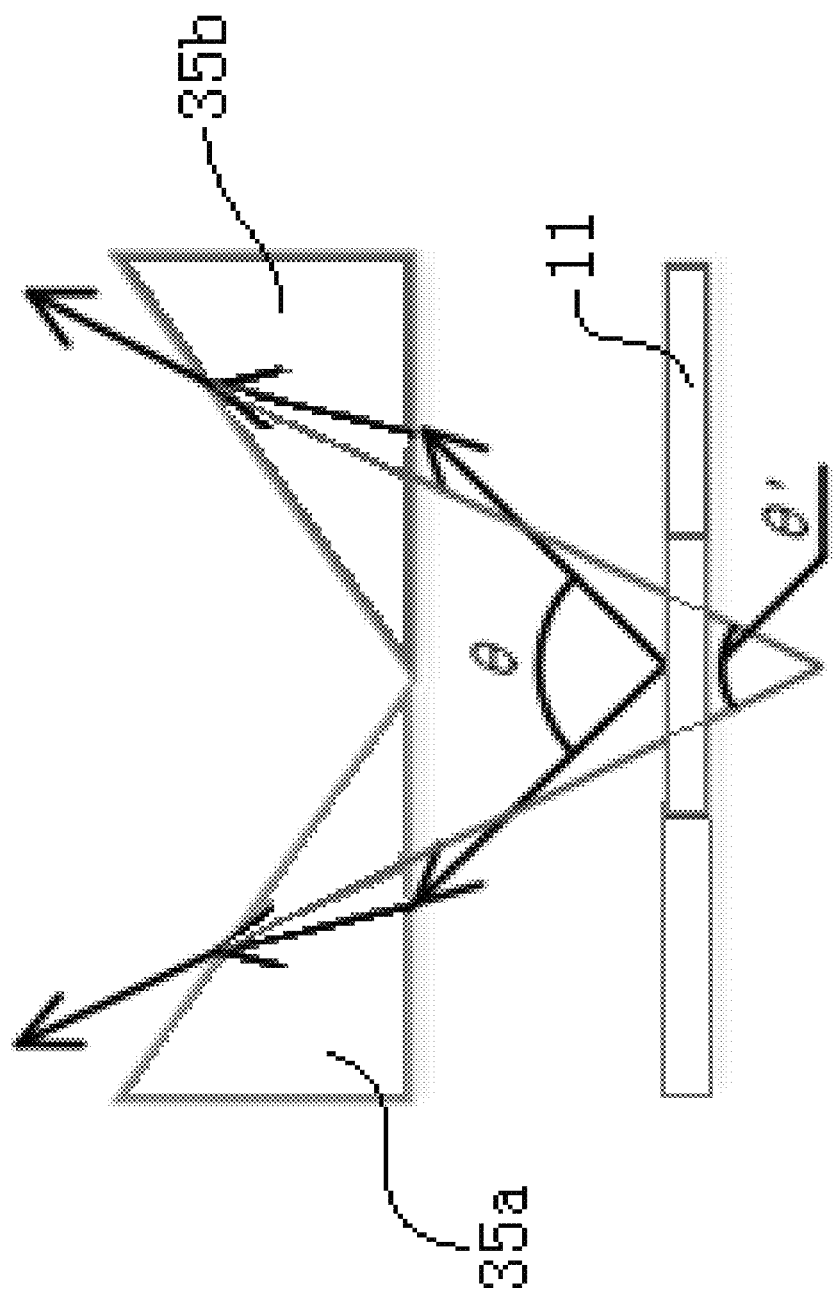
FIG. 3 is a schematic diagram of a pixel divergence angle of an integrated imaging apparatus after adjustment of an incident light adjusting member according to an embodiment of the present disclosure.
Figure 4:
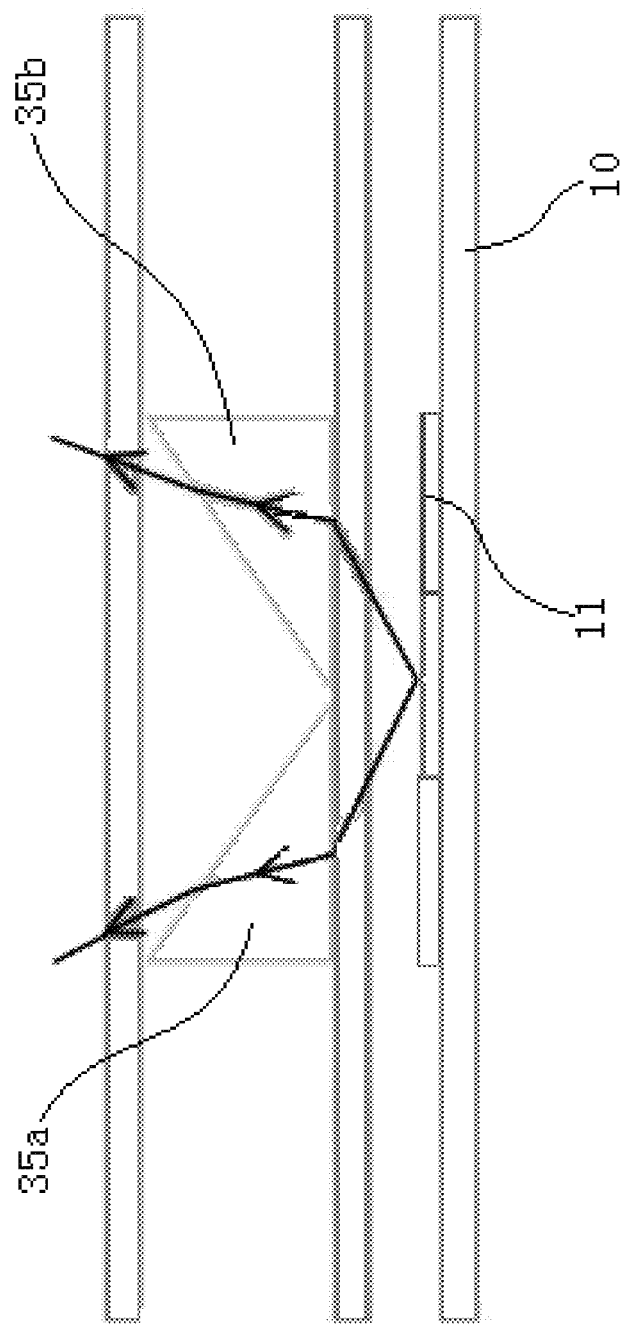
FIG. 4 is a schematic diagram of a display member and an incident light adjusting member according to an embodiment of the present disclosure.

Optionally, as illustrated in FIG. 3 and FIG. 4, a first prism unit 35a and a second prism unit 35b may be both a triangular prism; and correspondingly, each of the prism groups may include two prisms that are symmetrically arranged, wherein incident lights of the two prisms are in the same plane. Principle diagrams of changing the pixel exit angle of the incident light by the triangular prism are illustrated in FIG. 3 and FIG. 4. When an incident light is irradiated to the light incident surface of the triangular prism, the incident light is refracted on the light incident surface, and the refracted incident angle may be irradiated to a light exit surface of the triangular prism. In addition, the incident light may be refracted again on the light exit surface, and upon twice refractions, the exit angle of the incident light may be reduced relative to the incident angle thereof.

Figure 5:
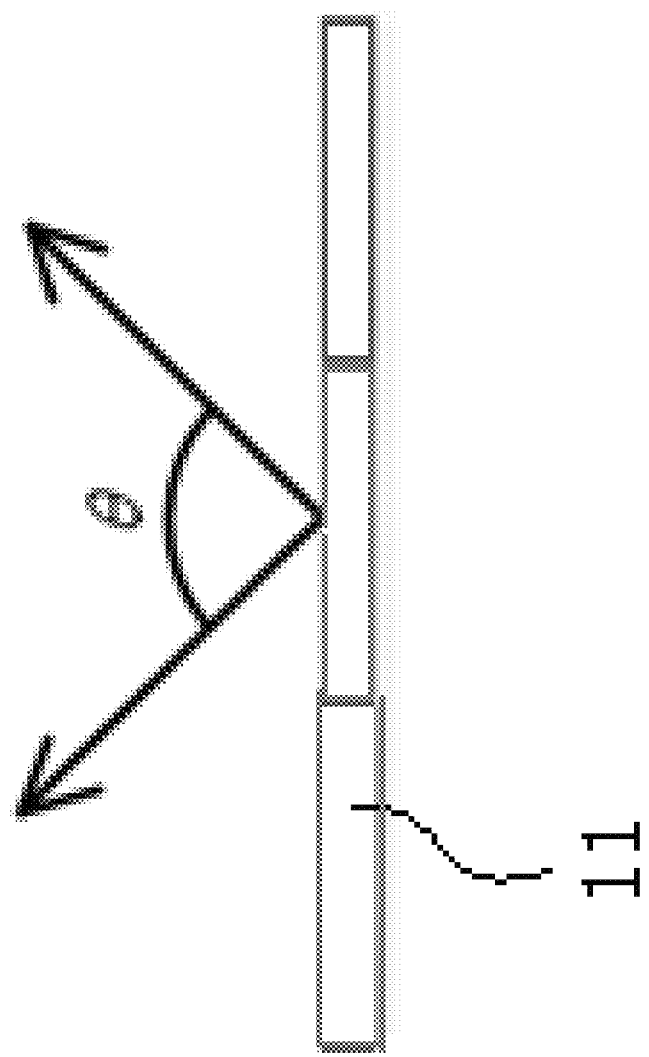
FIG. 5 is a schematic diagram of a pixel divergence angle of a conventional integrated imaging apparatus.

As illustrated in FIG. 5, θ represents the pixel divergence angle of the conventional integrated imaging apparatus 100. As illustrated in FIG. 3, a pixel divergence angle of an incident light emitted by a pixel unit 11 is also θ; wherein after the incident light passes through the prism group, the pixel divergence angle thereof is reduced to θ'. That is, θ' is the pixel divergence angle of the integrated imaging apparatus 100 according to the embodiment of the present disclosure. Through comparison between FIG. 5 and FIG. 3, it is known that the pixel divergence angle of the integrated imaging apparatus 100 according to the present disclosure is obviously reduced.

Optionally, the pixel divergence angle of the incident light of the pixel unit 11 is θ, a deflection angle of the light emitted by the prism group corresponding to the pixel unit is α, and the prism group may be configured to enable θ and α to satisfy θ'=θ−2α≤θ0; wherein δ0=2 arctan [p/(2g)], g is a distance from the display member 10 to the lens array, and p is a diameter of a first lens 21 in the lens array.

Herein, a relationship between the pixel divergence angles of various pixel units 11 of the display member 10 and the DOF is illustrated by the following formula:

$$DOF = \begin{cases} 2 \times \dfrac{S_{max}}{p} \times a, & \theta' > \theta_0 \\ 2 \times \dfrac{S_{max}}{2 \times \tan(\theta'/2) \times g} \times a, & \theta' \leq \theta_0 \end{cases}$$

As seen from the above formula, with the decrease of the pixel divergence angle of the pixel unit 11, the DOF may increase. However, the DOF may be restricted by the diameter p of the lens array, and when the pixel divergence angle of the pixel unit 11 exceeds a critical angle θ0, the DOF of the integrated imaging apparatus 100 is consistent with the DOF of the conventional integrated imaging apparatus. Therefore, when the pixel divergence angle θ is reduced and the formula θ'=θ−2α≤θ0 is satisfied, the DOF satisfying the use requirement may be obtained, and the DOF of the integrated imaging apparatus may be extended.

Figure 6:
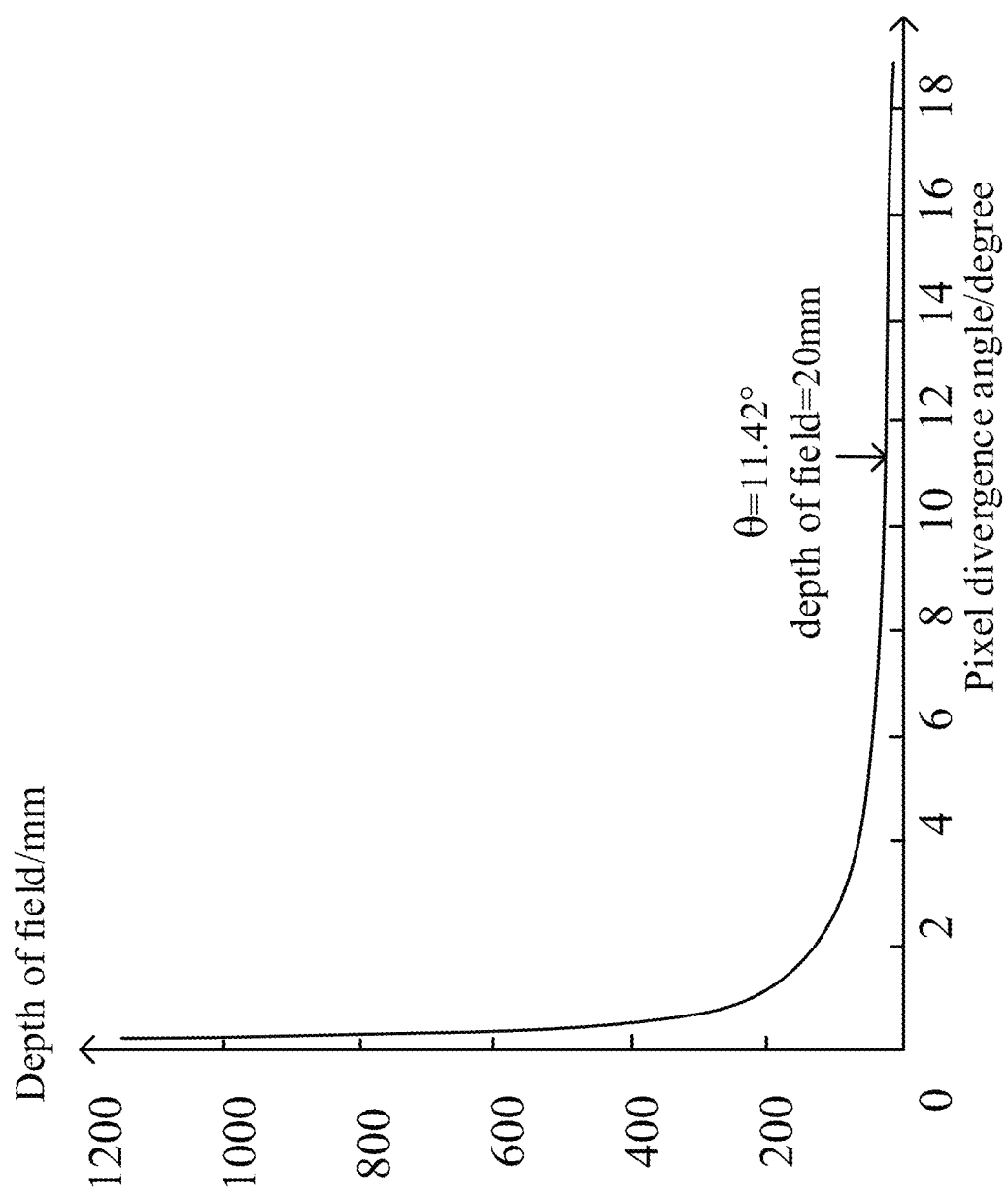
FIG. 6 is a schematic diagram of a relationship between a field of depth and a pixel divergence angle according to an embodiment of the present disclosure.

Exemplarily, using Smax=0.5 mm, p=5 mm and g=25 mm as examples, the relationship between the pixel divergence angle and the DOF is described. As illustrated in FIG. 6, when θ≤11.42°, the DOF increases with the decrease of the pixel divergence angle. When θ>11.42°, variations of the pixel divergence angle may nearly cause no impact to the DOF. In addition, when θ=11.42°, the DOF is equal to 20 mm. It is thus determined that the angle 11.42° is a maximum pixel divergence angle θ0 of the pixel unit 11. Accordingly, when the pixel divergence angle when the incident light passes through the incident light adjusting member is less than 11.42°, the DOF of the integrated imaging apparatus 100 may be extended. When the pixel divergence angle is greater than 11.42°, the DOF of the integrated imaging apparatus 100 is consistent with the DOF of the conventional integrated imaging apparatus.

Therefore, in structure design of the integrated imaging apparatus 100, defining the pixel divergence angle to be less than 11.42° may effectively improve the DOF of the integrated imaging apparatus 100, maximally extend the range of the DOF, and accurately control the pixel divergence angle, so as to accurately control the pixel divergence angle to decrease and extend the DOF.

Optionally, the incident light adjusting member 30 may be a liquid crystal prism. In this case, the refractive index of the liquid crystal prism may be adjusted in real time by electrical control, such that under effect of the liquid crystal prism, the pixel divergence angle of the light emitted by the display member 10 may be accurately adjusted. In this way, the operation stability of the DOF of the integrated imaging apparatus 100 may be effectively improved.

Figure 7:
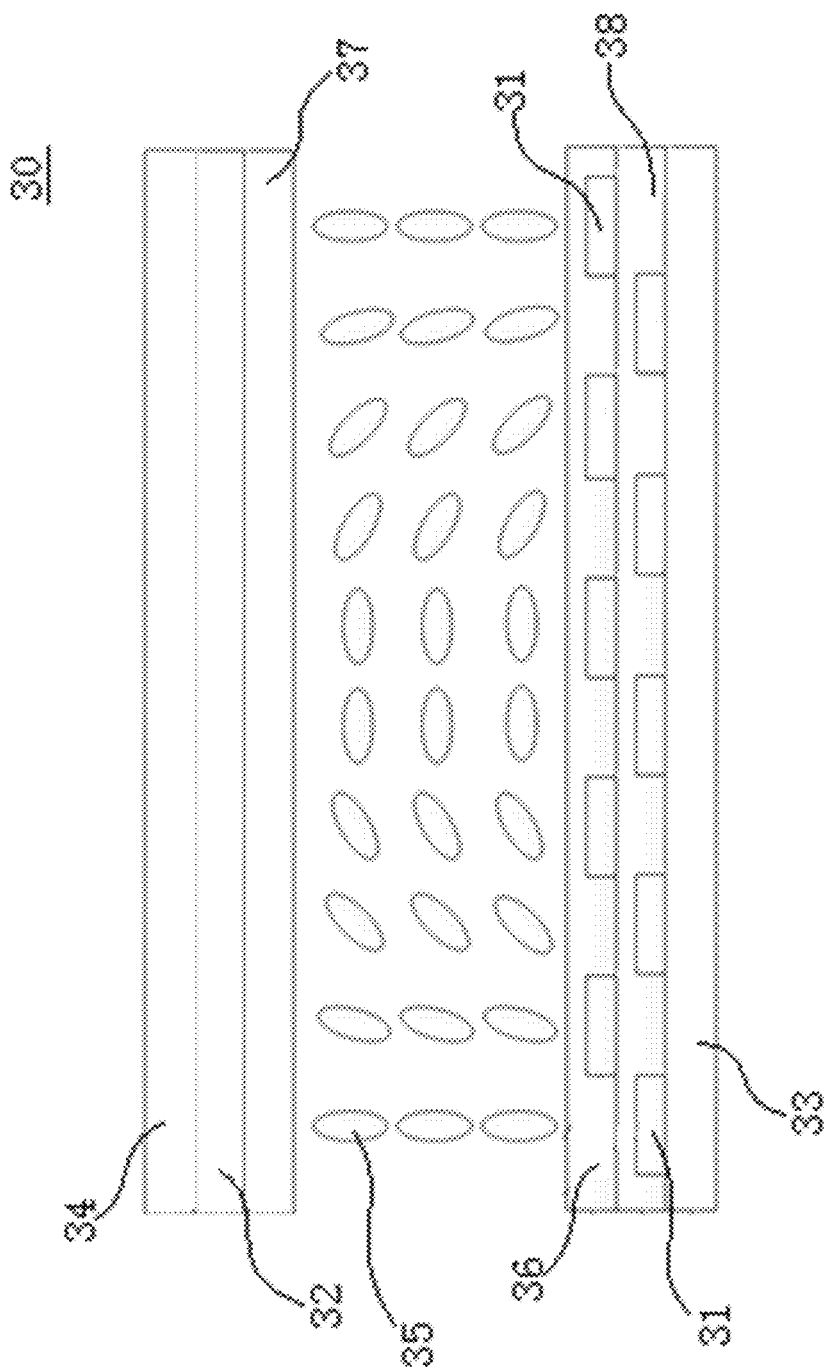
FIG. 7 is a schematic diagram of an incident light adjusting member of an integrated imaging apparatus according to an embodiment of the present disclosure.
Figure 8:
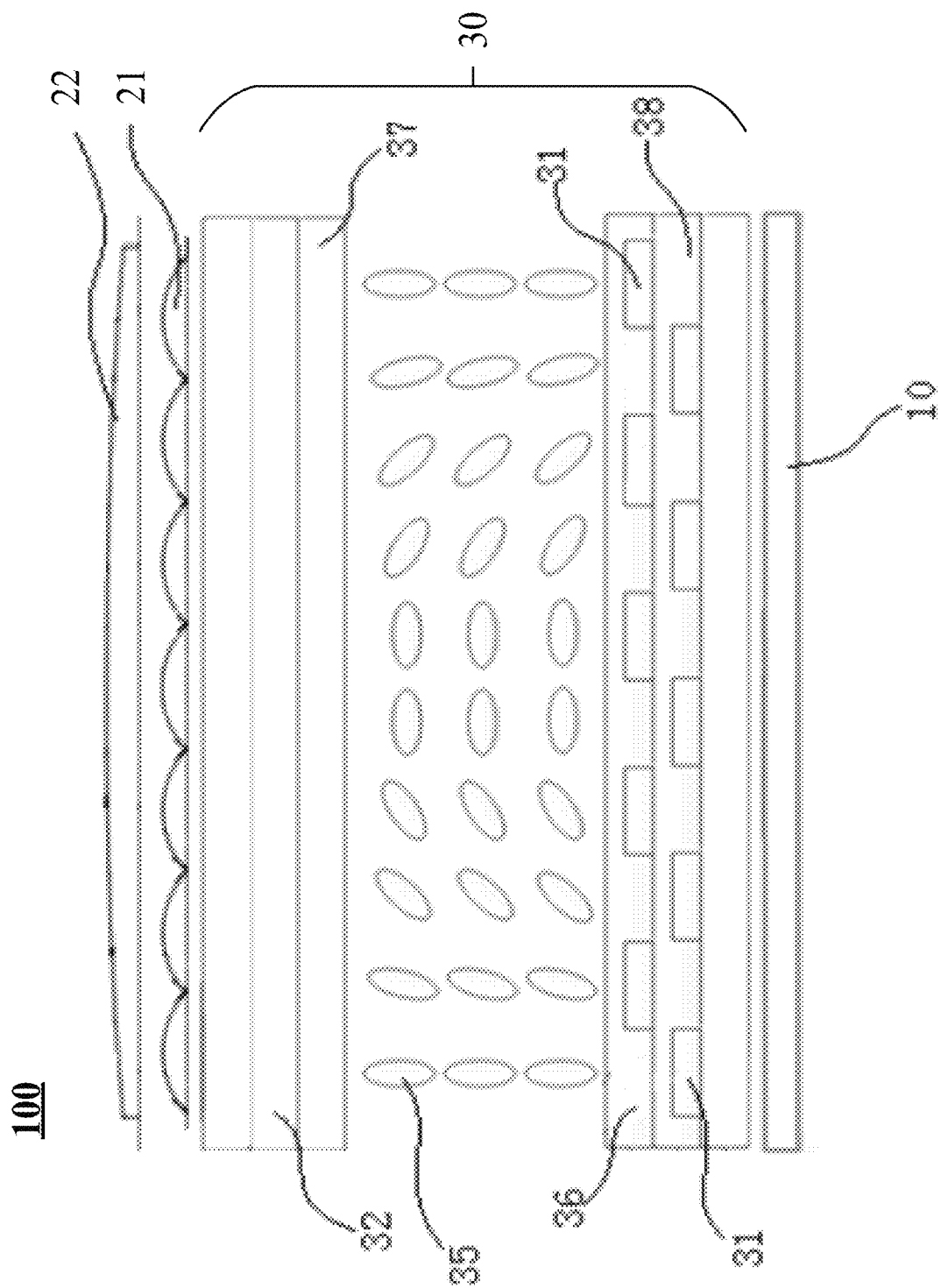
FIG. 8 is a schematic diagram of an integrated imaging apparatus according to an embodiment of the present disclosure.

FIG. 7 and FIG. 8 are schematic diagrams of a liquid crystal prism that serves as the incident light adjusting member 30. As illustrated in FIG. 7 and FIG. 8, the liquid crystal prism may include: a first substrate 33, a second substrate 34, a first electrode layer 32, a second electrode layer 31 and a liquid crystal layer 35. Herein, the second electrode layer is arranged on the first substrate 33, the first electrode layer 32 is arranged on the second substrate 34, the second electrode layer 31 includes a plurality of second electrodes, and the liquid crystal layer 35 is arranged between the first electrode layer 32 and the second electrode layer 31. By adjusting voltages of the first electrode layer and the second electrode layer, a deflection angle of liquid crystal molecules in the liquid crystal layer 35 may be adjusted, such that a refractive index of the liquid crystal layer may be adjusted and the pixel divergence angle of the incident light of the pixel unit 11 can be accurately controlled. In this way, an imaging effect of the integrated imaging apparatus 100 can be improved.

Optionally, the first electrode layer may be made from a transparent conductive material, and the second electrode layer may be made from a transparent conductive material. For example, the first electrode layer and the second electrode layer may be both made from indium tin oxide (ITO). Alternatively, the second electrode layer may be made from a high-impedance transparent conductive thin film with resistance being linearly distributed, and the first electrode layer may be made from a low-impedance transparent conductive thin film. The high-impedance transparent conductive thin film is a conductive thin film which not only has a high transparency in a visible light range, but also has a relatively high thermal stability. When the second electrode layer is prepared with the high-impedance transparent conductive thin film, the second electrode layer may have a relatively good conductive property, and a response speed of the incident light adjusting member 30 may be further improved, such that a working efficiency of the integrated imaging apparatus 100 may be improved.

Still referring to FIG. 7 and FIG. 8, for the sake of ensuring the imaging effect of the integrated imaging apparatus, the liquid crystal prism further includes: a first alignment layer 36 and/or a second alignment layer 34 for liquid crystal alignment. The first alignment layer is disposed on a side of the second electrode layer away from the first substrate. The second alignment layer is disposed on a side of the first electrode layer away from the second substrate.

In addition, the plurality of second electrodes of the second electrode layer 32 may be arranged in multiple layers, such that the orthographic projections of the plurality of second electrodes of different layers on the first substrate 33 are not overlapped. Further, the plurality of second electrodes of different layers may be arranged in a staggered manner along the first direction. For example, the plurality of second electrodes of different layers may be one by one arranged in a staggered manner along the first direction. By staggered arrangement of the second electrodes, the electrodes can avoid from each other in a thickness direction thereof. In this way, the total thickness of the second electrode layer 32 may be reduced, and the thickness of the incident light adjusting member 30 is reduced, such that the integrated imaging apparatus 100 has a smaller thickness.

As an implementation manner of second electrodes that are arranged in multiple layers, still referring to FIG. 7 and FIG. 8, the second electrode layer may include: a first sub-electrode layer and a second sub-electrode layer that are insulated from each other. The first sub-electrode layer and the second sub-electrode layer both include a plurality of second electrodes. An orthographic projection of the second electrodes of the first sub-electrode layer on the first substrate does not overlap an orthographic projection of the second electrodes of the second sub-electrode layer on the first substrate. Herein, the first sub-electrode layer and the second sub-electrode layer may be insulated from each other by arranging an insulating layer 38 between the first sub-electrode layer and the second sub-electrode layer.

Further, as illustrated in FIG. 7 and FIG. 8, the plurality of second electrodes of the first sub-electrode layer may be distributed inside the first alignment layer. That is, the first alignment layer is arranged on the plurality of second electrodes and covers a top surface and a side surface of each of the second electrodes. The plurality of second electrodes of the second sub-electrode layer may be distributed inside the insulating layer 38. That is, the insulating layer 38 is arranged on the plurality of second electrodes and covers a top surface and a side surface of each of the second electrodes. In this way, deployment of the integrated imaging apparatus 100 is more compact, and the thickness of the integrated imaging apparatus 100 is further reduced, such that the integrated imaging apparatus 100 satisfy the requirements of light-weighted and thinned design.

Each of the first prism units 35$a$ and each of the second prism units 35$b$ in the liquid crystal prism include a plurality of second electrodes, a first electrode layer and a liquid crystal layer disposed between the plurality of second electrodes and the first electrode layer.

Optionally, a potential difference between the plurality of second electrodes and the first electrode layer that form each of the first prism units 35$a$ may gradually increase along a first direction, a potential difference between the plurality of second electrodes and the first electrode layer that form each of the second prism units 35$b$ may gradually decrease along the first direction, and the plurality of first prism units 35$a$ and the plurality of second prism units 35$b$ in the liquid crystal prism are arranged in a staggered manner along the first direction. When the potential difference between the plurality of second electrodes and the first electrode layer of the first prism unit 35$a$ gradually increases along the first direction, the refractive index of the first prism unit 35$a$ gradually increases; and when the potential difference between the plurality of second electrodes and the first electrode layer of the second prism unit 35$b$ decreases along the first direction, the refractive index of the second prism unit 35$b$ gradually decreases, such that the incident light may be constantly deflected in the liquid crystal prism to accurately control the pixel divergence angle.

Figure 9:
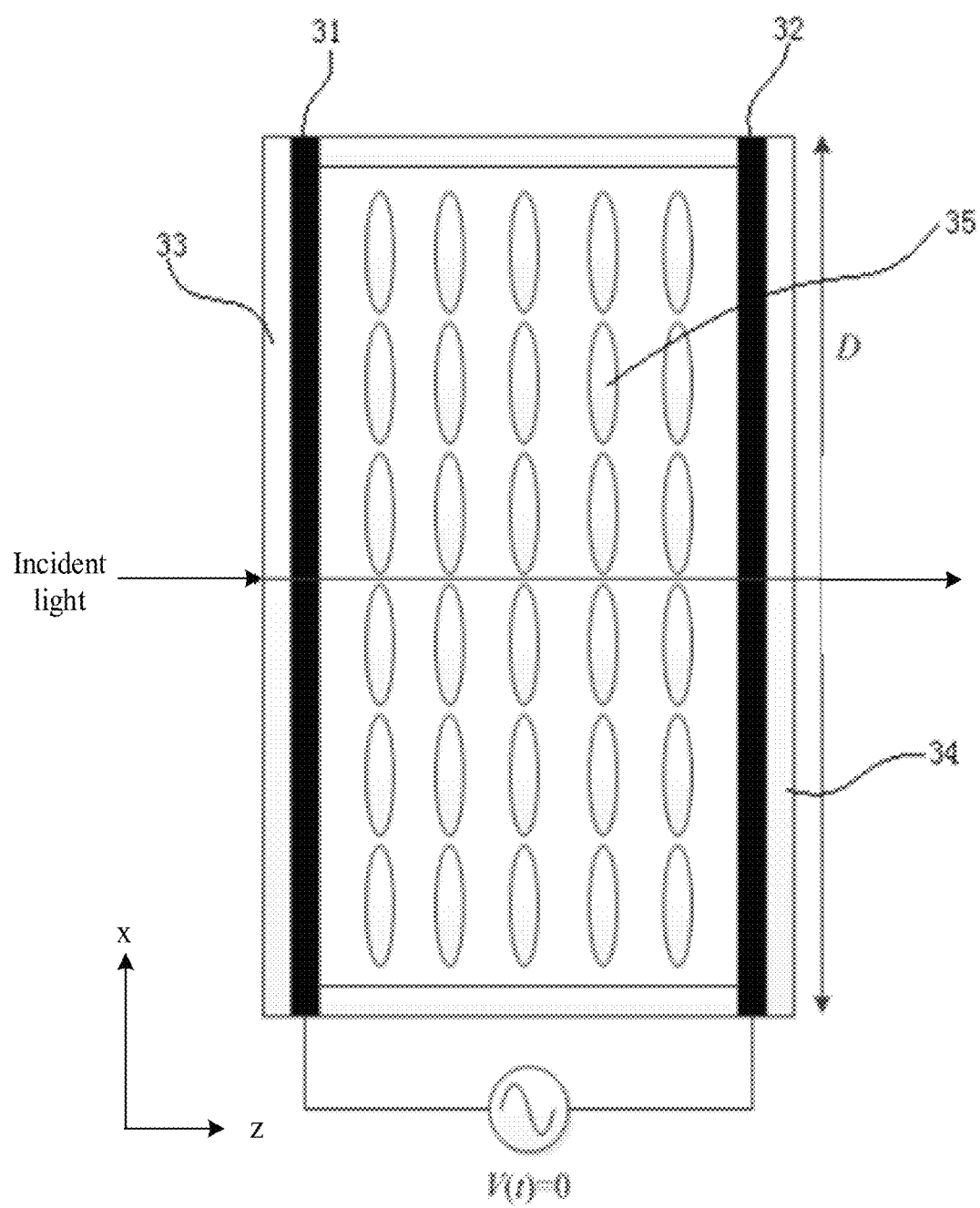
FIG. 9 is a schematic diagram of a first electrode layer, a second electrode layer, a first substrate, a second substrate and a liquid crystal layer in an integrated imaging apparatus according to an embodiment of the present disclosure (the liquid crystal is in a pressurized state)
Figure 10:
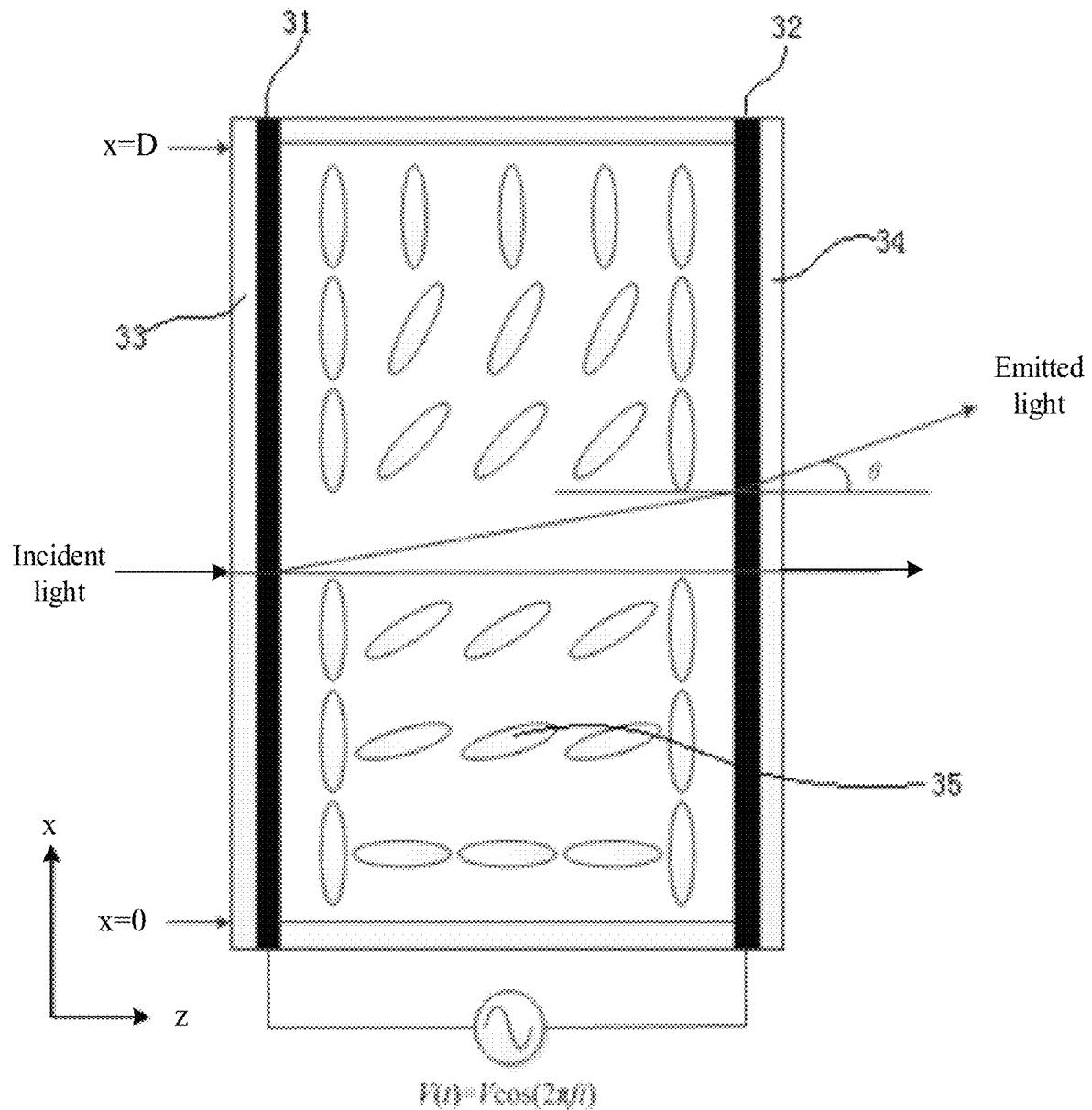
FIG. 10 is another schematic diagram of a first electrode layer, a second electrode layer, a first substrate, a second substrate and a liquid crystal layer in an integrated imaging apparatus according to an embodiment of the present disclosure (the liquid crystal is in a pressurized state)

Herein, principle diagrams of adjusting in real time the refractive index of the liquid crystal prism by electrical control may be referenced to FIG. 9 and FIG. 10. In FIG. 9 and FIG. 10, x direction is parallel to the direction of a plane where a light incident surface of the liquid crystal prism is located, z direction is perpendicular to the direction of the plane where the light incident surface of the liquid crystal prism is located. In FIG. 10, D represents a width of the pixel unit where the liquid crystal prism is located. As illustrated in FIG. 9, when a potential difference V(t) between the first electrode layer and the second electrode layer is 0, the liquid crystal molecules in the liquid crystal layer are not deflected. As illustrated in FIG. 10, a voltage is applied to both the first electrode layer and the second electrode layer, such that when the potential difference V(t) between the first electrode layer and the second electrode layer is equal to V×COS(2×π×f×t), the liquid crystal molecules in the liquid crystal layer are deflected. The deflected liquid crystal molecules are capable of deflecting the incident light irradiated on the liquid crystal molecules, such that a refractive angle of a light emitted by the liquid crystal prism is changed. For example, as illustrated in FIG. 10, a deflection angle of the light emitted by the liquid crystal prism is θ, and therefore, the refractive index of the liquid crystal prism may be changed by electrical control. In V(t)=V×COS(2×π×f×t), V represents an amplitude of a signal loaded to the second electrode, f represents a frequency of the signal loaded to the second electrode, and t represents time of loading the signal to the second electrode.

Figure 11:
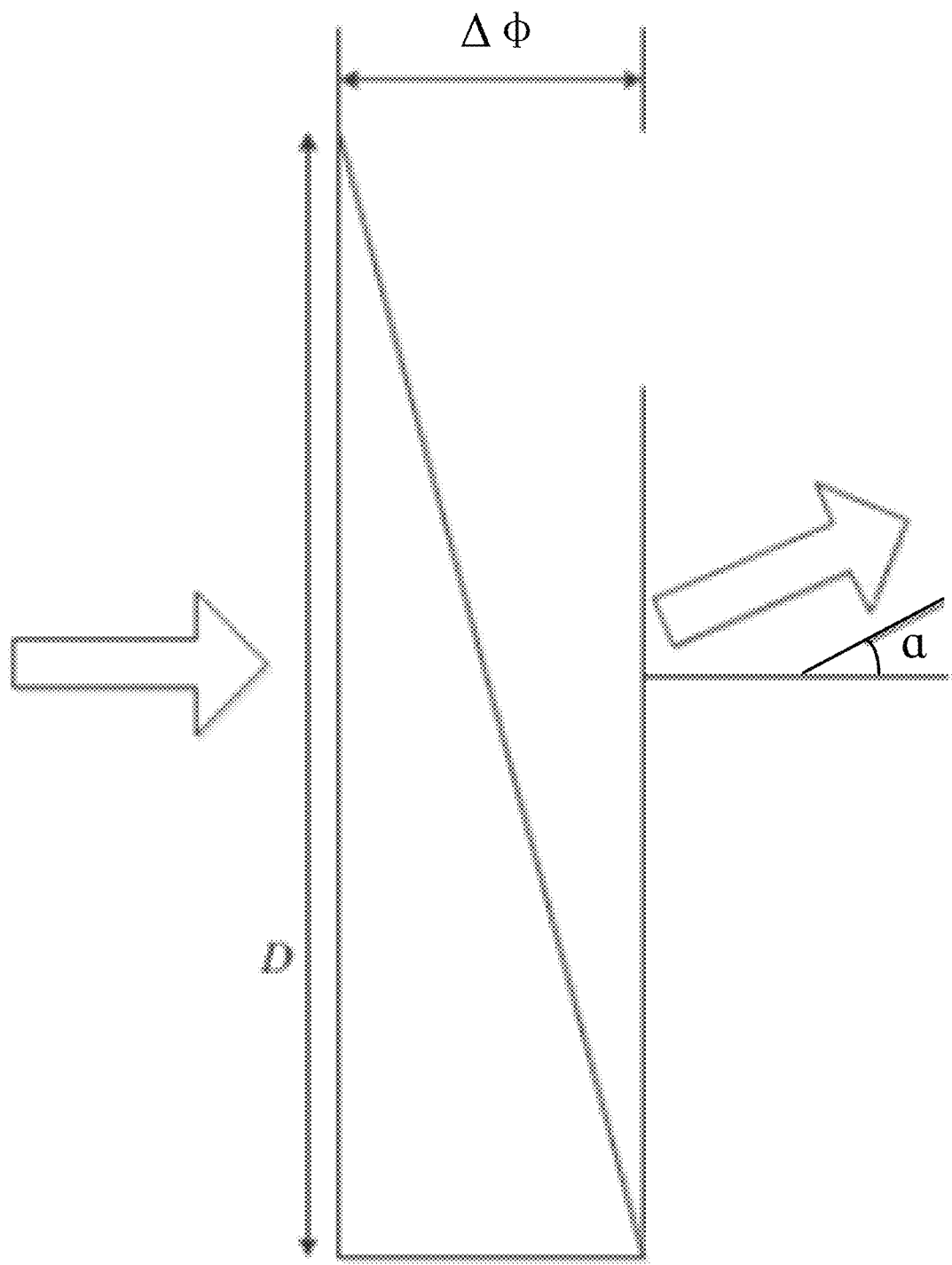
FIG. 11 is a schematic diagram of an equivalent prism formed by an incident light adjusting member of an integrated imaging apparatus according to an embodiment of the present disclosure.

As illustrated in FIG. 11, based on the refractive index theorem of the anisotropic crystals, a light refractive index of the liquid crystal molecules at any location (x, z) in the liquid crystal layer 35 satisfies the following formula:

$$n_e(x,z) = \frac{n_o n_e}{\sqrt{n_e^2 \cos^2\theta(x,z) + n_o^2 \sin^2\theta(x,z)}}$$

In the above formula, θ represents a tilt angle of a director of the liquid crystal molecules at this location relative to the z direction, $n_o$ represents a refractive index of the perpendicular liquid crystal molecules in a long axis direction, that is, an isotropic refractive index, and $n_e$ represents a refractive index of the parallel liquid crystal molecules in the long axis direction, that is, an anisotropic refractive index.

After passing through the liquid crystal layer 35, phase delay distribution of the incident light in the x direction satisfies the following formula:

$$\phi(x) = (2\pi/\lambda)n(x,z)d = (2\pi/\lambda)\int_0^d n_e(x,z)dz$$

In the above formula, λ represents a wavelength of the incident light, and d represents a distance of integration in the z direction, wherein a maximum value thereof is a width D of the pixel unit where the liquid crystal prism is located.

According to the phase delay distribution function, it may be known that a phase delay of the incident light at x=0 satisfies the following formula:

$$\phi(x=0) = \phi_0 = (2\pi/\lambda)n(0)d$$

A phase delay of the incident light at x=D satisfies the following formula:

$$\phi(x=D) = \phi_D = (2\pi/\lambda)n(D)d$$

Accordingly, an exit angle in the liquid crystal prism relative to the incident angle α (that is, the deflection angle of the incident light) satisfies the following formula:

$$(2\pi D/\lambda)\sin\alpha = \Delta\phi = \phi_D - \phi_0$$

Figure 12:
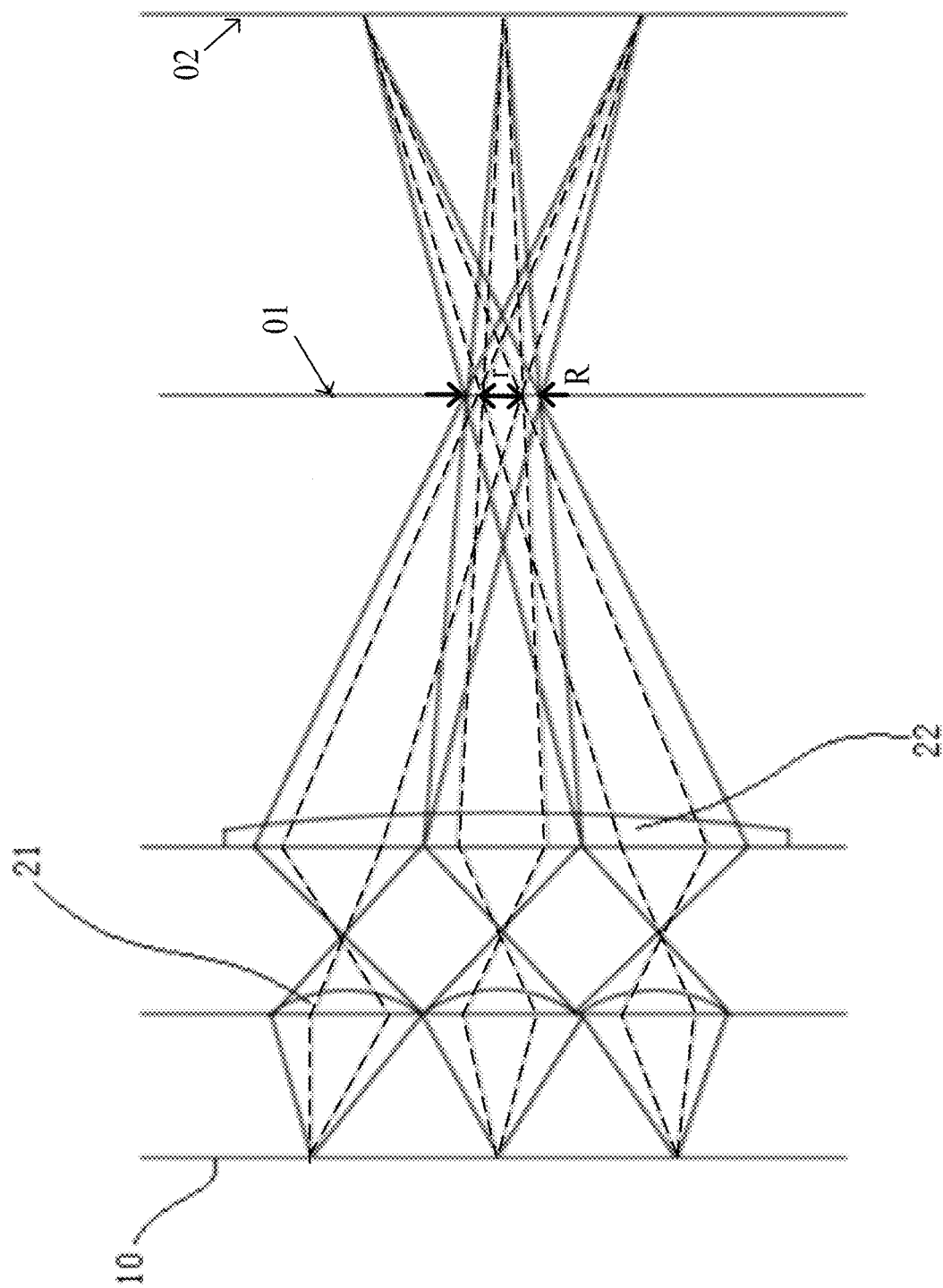
FIG. 12 is a comparison diagram of light spots on a left marginal display plane between an integrated imaging apparatus according to an embodiment of the present disclosure and a conventional integrated imaging apparatus.
Figure 13:
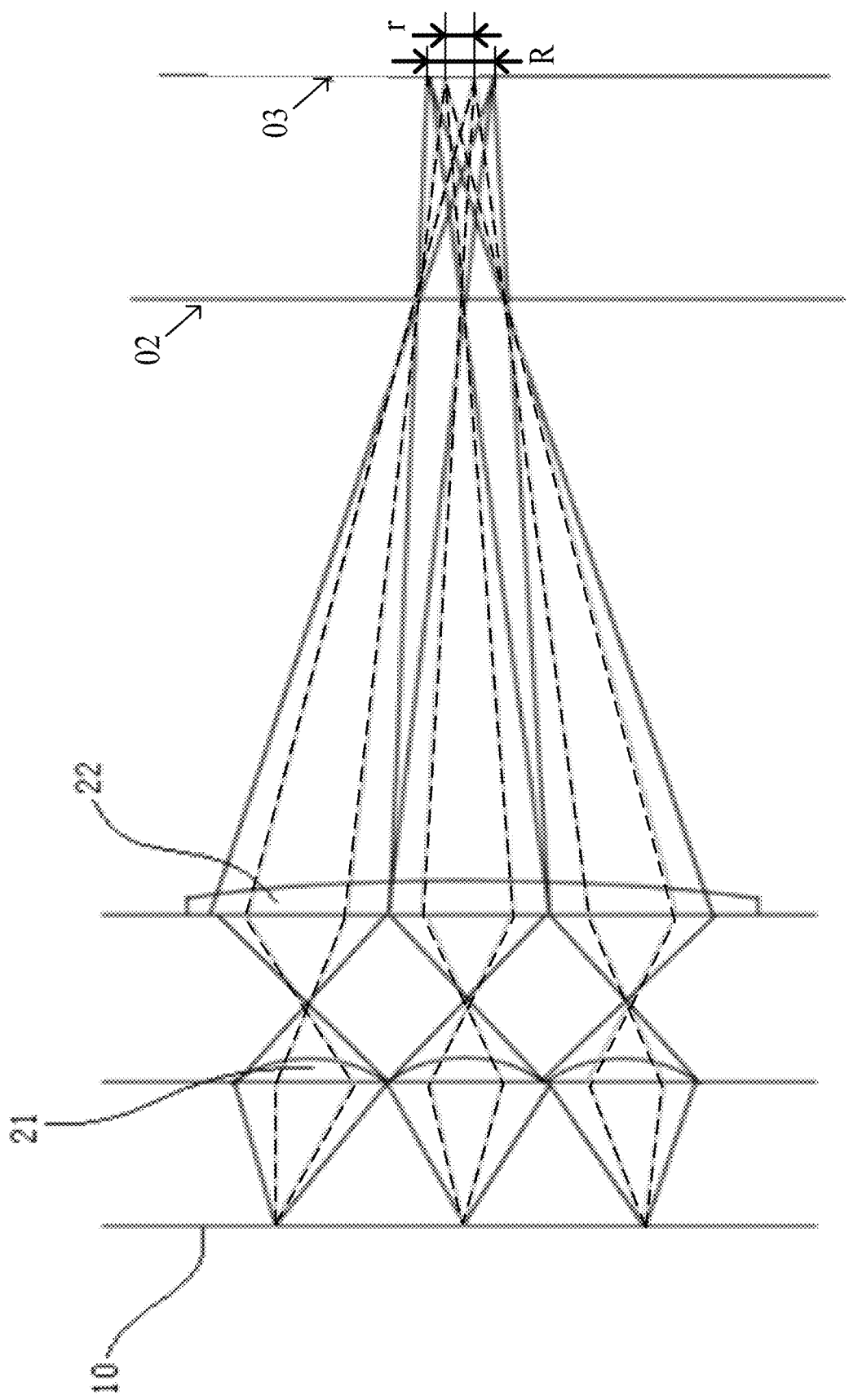
FIG. 13 is a comparison diagram of light spots on a right marginal display plane between an integrated imaging apparatus according to an embodiment of the present disclosure and a conventional integrated imaging apparatus.

Exemplarily, FIG. 12 and FIG. 13 both illustrate light path comparison of reproduction light spots on a left boundary plane and a right boundary plane between the integrated imaging apparatus according to the embodiment of the present disclosure and the conventional integrated imaging apparatus. In addition, in FIG. 12 and FIG. 13, dotted lines represent lights transmitted in the integrated imaging apparatus 100 according to the embodiment of the present disclosure, and solid lines represent lights transmitted in a conventional imaging apparatus in which no incident light adjusting member is arranged. As seen from FIG. 12 and FIG. 13, relative to the reproduction light spots R of the conventional integrated imaging apparatus, by adjusting the pixel divergence angle of the incident light, the correspondingly reproduction light spots r according to the embodiment of the present disclosure are obviously reduced. In this way, the resolution of the integrated imaging apparatus according to the embodiments of the present disclosure is improved.

Figure 14:
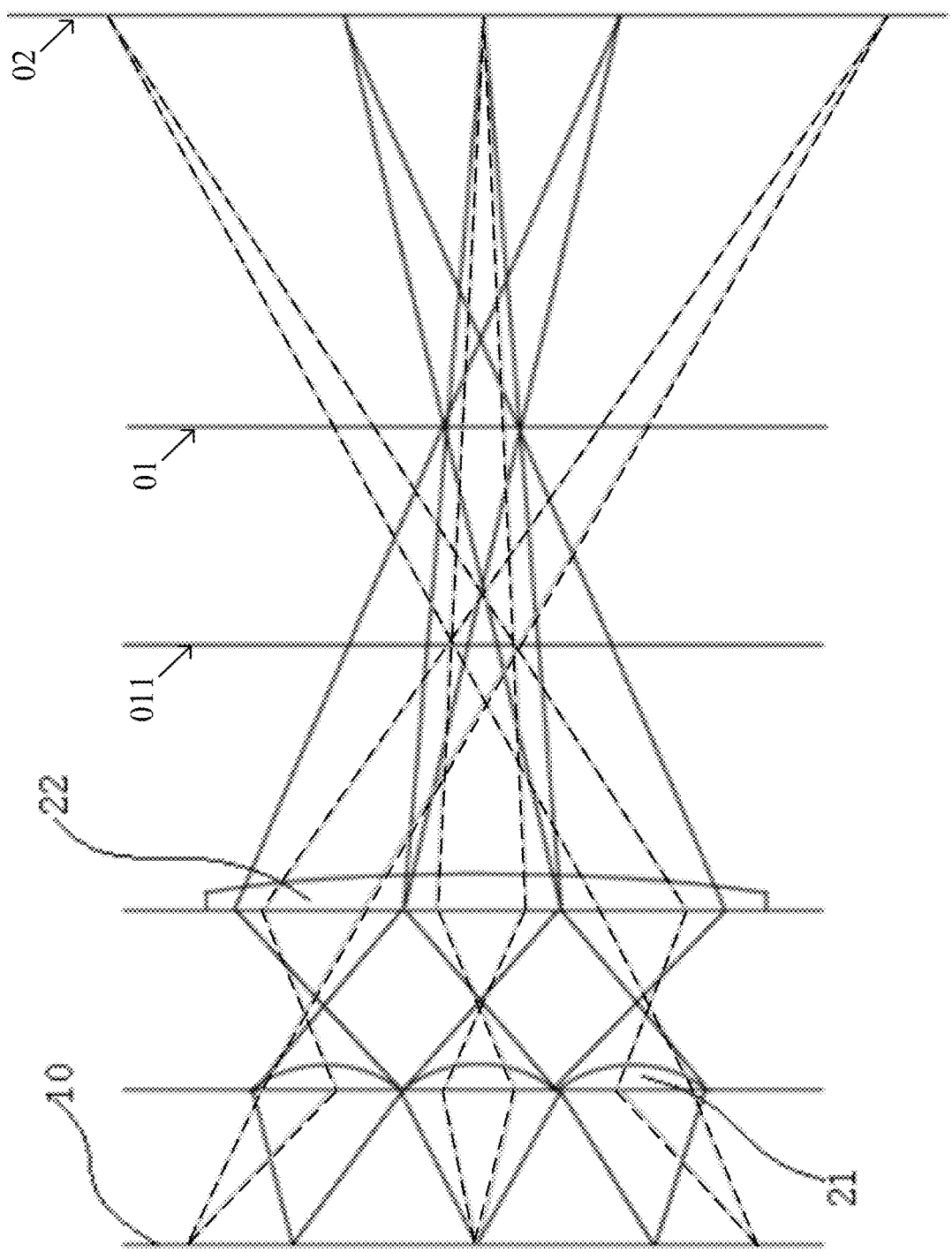
FIG. 14 is a comparison diagram of an extended depth of field on a left marginal display plane between an integrated imaging apparatus according to an embodiment of the present disclosure and a conventional integrated imaging apparatus.
Figure 15:
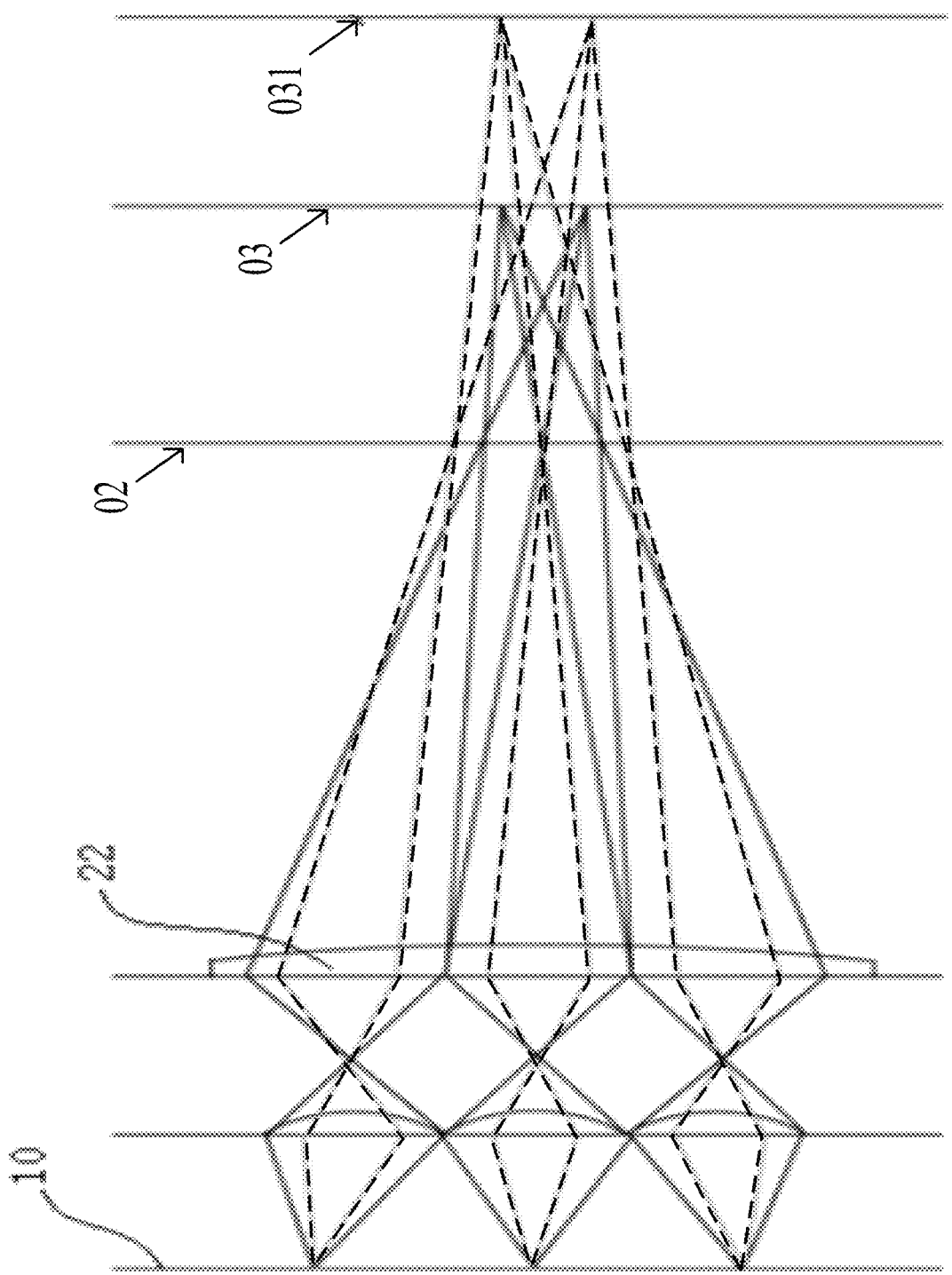
FIG. 15 is a comparison diagram of an extended depth of field on a right marginal display plane between an integrated imaging apparatus according to an embodiment of the present disclosure and a conventional integrated imaging apparatus.

FIG. 14 and FIG. 15 both illustrate comparison between the DOF of the conventional integrated imaging apparatus and the DOF of the integrated imaging apparatus according to the embodiment of the present disclosure. In FIG. 14 and FIG. 15, dotted lines represent lights transmitted in the integrated imaging apparatus 100 according to the embodiments of the present disclosure, and solid lines represent lights transmitted in a conventional imaging apparatus in which no incident light adjusting member is arranged. As seen from FIG. 14, when the location of the right marginal display plane is not changed, relative to the distance from the left marginal display plane to the right marginal display plane in the conventional integrated imaging apparatus, the distance from the left marginal display plane to the right marginal display plane in the integrated imaging apparatus according to the embodiment of the present disclosure is greater. As seen from FIG. 15, when the location of the left marginal display plane is not changed, relative to the distance from the left marginal display plane to the right marginal display plane in the conventional integrated imaging apparatus, the distance from the left marginal display plane to the right marginal display plane in the integrated imaging apparatus according to the embodiments of the present disclosure is greater. As such, it may be determined that the DOF according to the embodiments of the present disclosure is extended relative to the DOF in the prior art.

In summary, in the integrated imaging apparatus according to the embodiments of the present disclosure, the incident light adjusting member is arranged between the display member and the lens array, such that the pixel divergence angle of the incident light emitted by the display member may be adjusted. That is, the pixel divergence angle of the incident light is reduced by the incident light adjusting member, such that more incident lights are refracted to the vicinity of the central display plane. In this way, the image may be formed on the left marginal display plane and the right marginal display plane which are greatly away from each other, the DOF may be effectively extended, and the imaging effect of the integrated imaging apparatus may be improved. In addition, under the condition of electrical control of the divergence angle, the incident light can be deflected continuously, thereby realizing the precise control of the divergence angle of the pixels, reducing the divergence angle of the pixels, and further achieving the beneficial effect of extending the depth of field.

Figure 16:
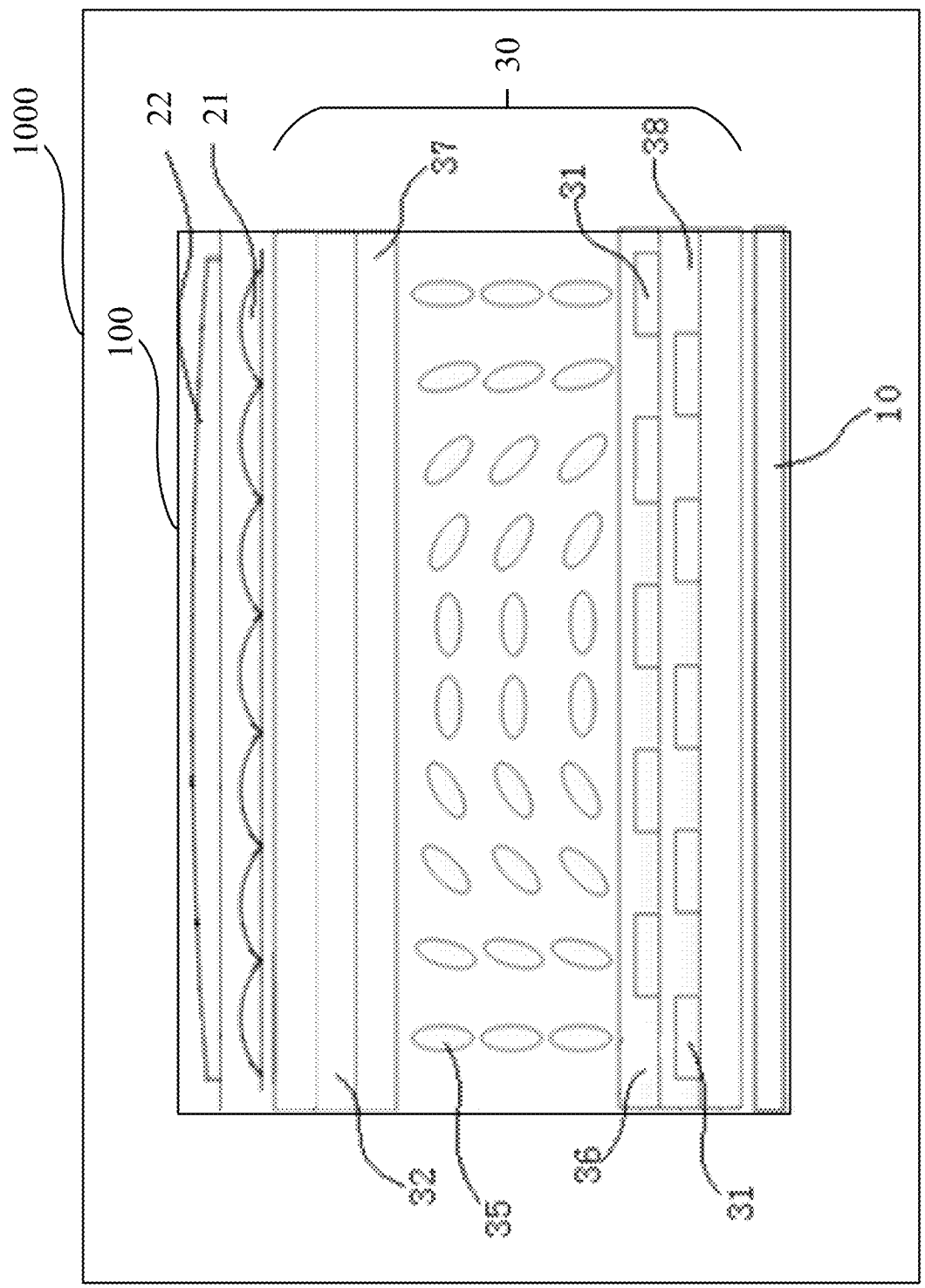
FIG. 16 is a schematic diagram of a display device according to an embodiment of the present disclosure.

There is further provided a display device 1000 in an embodiment of the present disclosure. As shown in FIG. 16, the display device 1000 includes: a control circuit and the integrated imaging apparatus 100 described in the above embodiments. The control circuit is configured to control the display member to display an image.

Optionally, the display device may include a processor and a memory, and may further include a housing. The processor, the memory, the control circuit and the integrated imaging apparatus may be in the housing.

The display device 1000 according to the embodiments of the present disclosure adopts the above integrated imaging apparatus 100, such that the divergence angle of the pixels of the pixel unit 11 may be adjusted by the incident light adjusting member 30 to achieve a better extended DOF and further better stereo imaging effect of the display panel.

It should be noted that the display device may be a liquid crystal device, an electronic paper, an OLED display device, a mobile phone, a tablet computer, a TV, a display, a laptop computer, a digital photo frame, a navigator, or any other products or parts with a display function.

Although the embodiments of the present disclosure have been shown and described above, it should be understood that the above embodiments are exemplary only, and cannot be understood as a limitation to the present disclosure.

Persons of ordinary skill in the art may make changes, modifications, substitutions and variations to the above embodiments within the scope of the present disclosure.

What is claimed is:

1. An integrated imaging apparatus, comprising: a display member, an incident light adjusting member, a lens array and a second lens that are sequentially arranged; wherein
the display member is configured to display an image;
the incident light adjusting member has an adjustable refractive index, and is configured to reduce a pixel divergence angle of an incident light emitted by the display member;
the lens array comprises a plurality of first lens, the plurality of first lens being arranged on a plane parallel to the display member; and
the second lens and the display member are coaxially arranged,
wherein the display member is a display panel having a plurality of pixel units, and the incident light adjusting member has a plurality of prism groups one-to-one corresponding to the plurality of pixel units, the prism group being configured to reduce a pixel divergence angle of an incident light of a corresponding pixel unit in the display panel;
the prism group comprises a first prism unit and a second prism unit that are symmetrically arranged, a light incident surface of the first prism unit and a light incident surface of the second prism unit being in a same plane; and,
the prism group is configured to enable a pixel divergence angle $\theta$ of the incident light of the corresponding pixel unit and a deflection angle $\alpha$ of a light emergent from the prism group to satisfy $\theta - 2\alpha \leq \theta 0$; wherein $\theta 0 = 2 \arctan[p/(2 \times g)]$, g being a distance from the display member to the lens array, and p being a diameter of a first lens in the lens array.

2. The integrated imaging apparatus according to claim 1, wherein the incident light adjusting unit is a liquid crystal prism.

3. The integrated imaging apparatus according to claim 2, wherein the liquid crystal prism comprises: a first substrate, a second substrate, a first electrode layer, a second electrode layer and a liquid crystal layer; wherein
the second electrode layer is arranged on the first substrate, the first electrode layer is arranged on the second substrate, the second electrode layer comprises a plurality of second electrodes, and the liquid crystal layer is arranged between the first electrode layer and the second electrode layer.

4. The integrated imaging apparatus according to claim 3, wherein the liquid crystal prism further comprises a first orientation layer, the first orientation layer being disposed on a side of the second electrode layer distal from the first substrate.

5. The integrated imaging apparatus according to claim 3, wherein the liquid crystal prism further comprises a first orientation layer, the second orientation layer being disposed on a side of the first electrode layer distal from the second substrate.

6. The integrated imaging apparatus according to claim 3, wherein the first electrode layer is made from a transparent conductive material.

7. The integrated imaging apparatus according to claim 3, wherein the second electrode layer is made from a transparent conductive material.

8. The integrated imaging apparatus according to claim 3, wherein the first electrode layer is made from indium tin oxide.

9. The integrated imaging apparatus according to claim 3, wherein the second electrode layer is made from indium tin oxide.

10. The integrated imaging apparatus according to claim 3, wherein the liquid crystal prism has a plurality of prism groups one-to-one corresponding to the plurality of pixel units, each of the prism groups comprising a first prism unit and a second prism unit that are symmetrically arranged, a light incident surface of the first prism unit and a light incident surface of the second prism unit being in a same plane;
wherein each of the first prism units and each of the second prism units both comprise a first electrode layer, a plurality of second electrodes and a liquid crystal layer arranged between the first electrode layer and the plurality of second electrodes, a potential difference between the plurality of second electrodes and the first electrode layer of each of the first prism units gradually increasing along a first direction, a potential difference between the plurality of second electrodes and the first electrode layer of each of the second prism units gradually decreasing along the first direction, and a plurality of first prism units and a plurality of second prism units in the liquid crystal prism are arranged in a staggered manner along the first direction.

11. The integrated imaging apparatus according to claim 3, wherein the second electrode layer comprises a first sub-electrode layer and a second sub-electrode layer that are insulated from each other, the first sub-electrode layer and the second sub-electrode layer both comprising a plurality of second electrodes, an orthographic projection of the second electrodes of the first sub-electrode layer on the first substrate not overlapping an orthographic projection of the second electrodes of the second sub-electrode layer on the first substrate.

12. The integrated imaging apparatus according to claim 11, wherein the plurality of second electrodes of the first sub-electrode layer and the plurality of second electrodes of the second sub-electrode layer are arranged in a staggered manner.

13. The integrated imaging apparatus according to claim 11, wherein the liquid crystal prism further comprises an insulating layer, the insulating layer being arranged between the first electrode layer and the second electrode layer.

14. The integrated imaging apparatus according to claim 1, wherein the integrated imaging apparatus comprises: a display member, a liquid crystal prism, a lens array and a second lens that are sequentially arranged; wherein
the display member is configured to display an image;
the liquid crystal prism has an adjustable refractive index, and is configured to reduce a pixel divergence angle of an incident light emitted by the display member;
the lens array comprises a plurality of first lens, the plurality of first lens being arranged on a plane parallel to the display member;
the second lens and the display member are coaxially arranged;
the liquid crystal prism comprises: a first sub-electrode layer, an insulating layer, a second sub-electrode layer and an orientation layer that are stacked on the first substrate, the first sub-electrode layer and the second sub-electrode layer both comprising a plurality of second electrodes, the plurality of second electrodes of the first sub-electrode layer and the plurality of second electrode of the second sub-electrode layer being arranged in a staggered manner, an orthographic projection of the second electrodes of the first sub-electrode layer on the first substrate not overlapping an orthographic projection of the second electrodes of the second sub-electrode layer on the first substrate;

a first electrode layer and a second orientation layer stacked on the second substrate; and a liquid crystal layer arranged between the first orientation layer and the second orientation layer;

wherein the liquid crystal prism has a plurality of prism groups one-to-one corresponding to the plurality of pixel units, each of the prism groups comprising a first prism unit and a second prism unit that are symmetrically arranged, a light incident surface of the first prism unit and a light incident surface of the second prism unit are in a same plane;

wherein each of the first prism units and each of the second prism units both comprise a first electrode layer, a plurality of second electrodes and a liquid crystal layer arranged between the first electrode layer and the plurality of second electrodes, a potential difference between the plurality of second electrodes and the first electrode layer of each of the first prism units gradually increasing along a first direction, a potential difference between the plurality of second electrodes and the first electrode layer of each of the second prism units gradually decreasing along the first direction, and a plurality of first prism units and a plurality of second prism units in the liquid crystal prism are arranged in a staggered manner along the first direction.

15. The integrated imaging apparatus according to claim 1, wherein the display member is a liquid crystal display panel.

16. The integrated imaging apparatus according to claim 1, wherein the display member is an organic light-emitting diode display panel.

17. A display device, comprising: a control circuit and an integrated imaging apparatus, the integrated imaging apparatus comprising: a display member, an incident light adjusting member, a lens array and a second lens that are sequentially arranged; wherein the control circuit is configured to control the display member to display an image;

the incident light adjusting member has an adjustable refractive index, and is configured to reduce a pixel divergence angle of an incident light emitted by the display member;

the lens array comprises a plurality of first lens, the plurality of first lens being arranged on a plane parallel to the display member; and the second lens and the display member are coaxially arranged, wherein the display member is a display panel having a plurality of pixel units, and the incident light adjusting member has a plurality of prism groups one-to-one corresponding to the plurality of pixel units, the prism group being configured to reduce a pixel divergence angle of an incident light of a corresponding pixel unit in the display panel;

the prism group comprises a first prism unit and a second prism unit that are symmetrically arranged, a light incident surface of the first prism unit and a light incident surface of the second prism unit being in a same plane; and, the prism group is configured to enable a pixel divergence angle $\theta$ of the incident light of the corresponding pixel unit and a deflection angle $\alpha$ of a light emergent from the prism group to satisfy $\theta-2\alpha \leq \theta 0$; wherein $\theta 0 = 2 \arctan[p/(2 \times g)]$, g being a distance from the display member to the lens array, and p being a diameter of a first lens in the lens array.

* * * * *